(12) United States Patent
Esslinger et al.

(10) Patent No.: US 10,383,483 B2
(45) Date of Patent: Aug. 20, 2019

(54) MIXING VESSEL FOR AN ELECTRIC MOTOR-OPERATED FOOD PROCESSOR

(71) Applicant: Vorwerk & Co. Interholding GmbH, Wuppertal (DE)

(72) Inventors: Michael Esslinger, Rottweil (DE); Daniel Zuber, Wuppertal (DE); Patrick Scholder, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 128 days.

(21) Appl. No.: 15/696,788

(22) Filed: Sep. 6, 2017

(65) Prior Publication Data
US 2018/0064288 A1   Mar. 8, 2018

(30) Foreign Application Priority Data

Sep. 7, 2016 (DE) .................. 10 2016 116 757

(51) Int. Cl.
| | | |
|---|---|---|
| A47J 43/00 | (2006.01) | |
| A47J 43/07 | (2006.01) | |
| B01F 15/00 | (2006.01) | |
| B02C 18/12 | (2006.01) | |
| B02C 23/04 | (2006.01) | |

(52) U.S. Cl.
CPC ....... *A47J 43/0761* (2013.01); *A47J 43/0766* (2013.01); *B01F 15/00538* (2013.01); *B02C 18/12* (2013.01); *B02C 23/04* (2013.01); *B01F 2215/0014* (2013.01)

(58) Field of Classification Search
CPC ...... B02C 18/12; B02C 23/04; A47J 43/0766; A47J 43/0761; B01F 15/00538; B01F 2215/0014
See application file for complete search history.

(56) References Cited

U.S. PATENT DOCUMENTS 6,186,425 B1 * 2/2001 Celso De Almeida Mattos .......... A47J 43/046 241/100
2006/0028912 A1 * 2/2006 Lee ....................... A47J 43/046 366/206

FOREIGN PATENT DOCUMENTS

| DE | 10 2010 016 667 A1 | 11/2011 |
|---|---|---|
| EP | 2 875 762 A1 | 5/2015 |

* cited by examiner

*Primary Examiner* — Anshu Bhatia
(74) *Attorney, Agent, or Firm* — Collard & Roe, P.C.

(57) ABSTRACT

A mixing vessel for an electric motor-operated food processor, with a vessel floor, an agitator extending through the vessel floor into the mixing vessel, and a foot part that can be externally connected with the vessel floor, which is designed for fixing the agitator to the vessel floor. In order to prevent a user from filling the mixing vessel without the agitator properly assembled in the food processor, it is proposed that the vessel floor or foot part have a blocking element that can be exposed to the spring force of a spring element, and can be shifted against the spring force by means of a corresponding contact element of the foot part or vessel floor from a blocking position that prevents a fixation of the agitator into a release position that enables a fixation.

10 Claims, 10 Drawing Sheets

MIXING VESSEL FOR AN ELECTRIC MOTOR-OPERATED FOOD PROCESSOR

CROSS REFERENCE TO RELATED APPLICATIONS

Applicant claims priority under 35 U.S.C. § 119 of German Application No. 10 2016 116 757.6 filed on Sep. 7, 2016, the disclosure of which is incorporated by reference.

AREA OF TECHNOLOGY

The invention relates to a mixing vessel for an electric motor-operated food processor, with a vessel floor, an agitator extending through the vessel floor into the mixing vessel, and a foot part that can be externally connected with the vessel floor, and is designed for fixing the agitator to the vessel floor.

In addition, the invention relates to an electric motor-operated food processor with a base unit and a mixing vessel that can be connected with the base unit.

PRIOR ART

Mixing vessels of the kind in question are known, for example from DE 10 2010 016 667 A1 or EP 2 875 762 B1.

The mixing vessels are used in particular in conjunction with an electric motor-operated food processor, further in particular in the household sector. In order to mix or comminute media introduced into the mixing vessel, in particular introduced foods, an agitator is allocated to a vessel floor of the mixing vessel, for example in the form of a blade unit. An agitator shaft of the agitator passes through the vessel floor, in particular to yield a coupling cam that protrudes freely downward over the vessel floor. Further known in this regard is to insert the mixing vessel into a mixing vessel holder of a base unit of the food processor, in which the mixing vessel stands on a contact surface with the help of a pot-shaped foot part. In addition, such a foot part serves in a known manner to place the mixing vessel on a working surface or the like after removing it from the food processor.

It is further known to detachably arrange the agitator on the mixing vessel, for example for cleaning and/or replacement purposes. To this end, for example, the agitator can be arranged on the vessel floor by means of a bayonet attachment, while also preferably incorporating and fixing the foot part on the mixing vessel.

The mixing vessel passes through the vessel floor with a bearing body that can be non-rotationally arranged on the vessel floor, and designed as a single piece or multiple pieces. The agitator shaft in turn passes through the bearing body. In this regard, it is further known for non-rotational fixation on the vessel floor to provide projections on the outer wall of the bearing body, which interact with a corresponding contour of an opening in the vessel floor and/or the foot part.

In mixing vessels known in prior art, it is basically possible that the user of a mixing vessel will forget to fasten the agitator to the vessel floor, and thereby seal the opening formed in the vessel floor. If he or she then fills the mixing vessel with foods, in particular liquids, the latter might spill out of the mixing vessel and into the base unit of the food processor, which could do damage there.

SUMMARY OF THE INVENTION

In view of the prior art described above, it is thus the object of the invention to further develop a mixing vessel of the aforementioned kind in such a way as to prevent the mixing vessel from being inadvertently inserted into the food processor without an agitator.

In order to achieve the above object, it is proposed that the vessel floor or foot part have a blocking element that can be exposed to the spring force of a spring element, and can be shifted against the spring force by means of a corresponding contact element of the foot part or vessel floor from a blocking position that prevents a fixation of the agitator into a release position that enables a fixation.

In the absence of an agitator on the vessel floor, this inventive configuration also prevents the foot part from becoming fixed on the vessel floor. As a consequence, the foot part remains displaceable relative to the vessel floor, and is always pressed back into the blocking position by the blocking element given attempts at fixation by the user. In this blocking position, the blocking element prevents insertion of the mixing vessel into the electric motor-operated food processor, since the mixing vessel can no longer be accommodated in the usual fashion, but rather, for example, no longer corresponds with the shape of the mixing vessel receptacle of the food processor or undergoes a dimensional change, for example which prevents the mixing vessel from being locked with a cover. As a consequence, the user is made aware that the mixing vessel is not properly mounted, allowing for a corresponding improvement before damage is done to the food processor. Only when the agitator is properly fastened to the vessel floor, i.e., fixed on the vessel floor, e.g., clamped, via the foot part is the foot part also non-rotationally joined with the vessel floor of the mixing vessel, for example so that the contact element of the foot part shifts the blocking element of the vessel floor from the blocking position into the release position, thereby enabling a connection between the mixing vessel and electric motor-operated food processor. As an alternative to the vessel floor, the foot part can also have a locking element exposed to the spring force of a spring element. In this case, the corresponding contact element is located on the vessel floor. Here as well, the agitator must be properly fixed on the vessel floor by means of the foot part so as to shift the blocking element into the release position.

For example, the blocking element arranged either on the vessel floor or foot part can have a separate spring element, e.g., a helical spring, leg spring, bending spring, torsion spring and the like, or itself consist of an elastic material, so that the blocking element itself is a spring element that provides a spring force. The blocking element can here be comprised of metal, for example, preferably of corrosion-resistant austenitic stainless steel or martensitic hardened steel with an anti-corrosion coating. The blocking element can further also be made out of plastic, for example out of a glass fiber plastic or the like.

The contact element arranged on the foot part or vessel floor is situated and configured in such a way as to protrude into a displacement path of the blocking element (in relation to a position of the foot part arranged on the mixing vessel), which the blocking element traverses when moving from the release position into the blocking position and vice versa. While fixing the agitator, and hence also the foot part, in place on the vessel floor, the foot part is usually rotated relative to the vessel floor (around a rotational axis of the agitator), thereby pressing the contact element against the blocking element. The contact element can here be a pin, projection, partial wall section of the like formed on the vessel floor or foot part.

It is further proposed that the blocking element be arranged on the vessel floor or foot part in such a way relative to a relaxed state of the spring element as to protrude into a connecting area formed to join the mixing vessel with an electric motor-operated food processor, thereby preventing a connection. In the blocking position, the blocking element is thus in an area in which, when the mixing vessel is properly connected with the base unit of the food processor, corresponding elements intermesh, contact each other or the like. If the blocking element has been shifted into the release position, these elements can be guided toward each other in a conventional manner, so that the mixing vessel can be inserted into the food processor. By contrast, if the blocking element protrudes into this connecting area, it presents an obstacle that prevents a connection from being established between the mixing vessel and mixing vessel receptacle of the food processor. In particular, the mixing vessel can as a result stand at an inclination in the mixing vessel receptacle, have too large a height that prevents the mixing vessel from being locked with a cover, and so on.

In particular, it is proposed that the connecting area have electrical contacts for connection with corresponding counter-contacts of an electric motor-operated food processor. If the agitator has not been inserted into the vessel floor, fixation between the agitator and vessel floor, and hence also between the foot part and vessel floor, cannot be achieved. As a result, for example, it may not be possible to move the foot part into a conventional end position on the mixing vessel, and the connecting area of the vessel floor having the electrical contacts remains partially covered by a portion of the foot part, so that the electrical contacts cannot be connected with counter-contacts of the food processor. At the same time, the addressed portion of the foot part can thereby come to rest on the counter-contacts, and as a result increase the height of the mixing vessel by comparison to the properly assembled configuration of the mixing vessel or also cause the mixing vessel to assume an inclined position in the food processor. This configuration is suitable both for embodiments in which the blocking element is arranged on the vessel floor, as well as for embodiments in which the blocking element is arranged on the foot part. In both cases, at least one of the electrical contacts of the mixing vessel can be covered within the connecting area.

It is further proposed that the blocking element be a pawl pivoted to the vessel floor, which can be pivoted around a swivel axis arranged perpendicular to the vessel floor. In this embodiment, the blocking element is arranged on the vessel floor of the mixing vessel. The blocking element can be pivoted within a plane aligned parallel to the plane of the vessel floor. As a result, the pawl can be pivoted over at least a portion of the vessel floor, in particular of the aforementioned connecting area used for connection with the food processor. In an especially easy manner, this causes the blocking element to be displaced from the blocking position into the release position and vice versa.

An alternative embodiment proposes that the blocking element be a locking bolt slideably arranged on the foot part, which can be shifted into a plane parallel to the vessel floor relative to a connected state of the vessel floor and foot part. In the release position, the locking bolt is arranged on a portion of the foot part in such a way that the locking bolt does not protrude into a connecting area of the vessel floor, which is required for properly connecting the mixing vessel with the electric motor-operated food processor. The spring force acting on the locking bolt holds the blocking element in the blocking position given a lack of contact between the blocking element and a contact element of the vessel floor, so that no fixation between the foot part and vessel floor is possible with the agitator missing, also making it impossible to overcome the restoring power of the spring element. For example, the locking bolt can be a linear locking bolt, or also a locking bolt that is designed like a circular ring segment and can be rotated around a central opening of the foot part.

In particular, it can be provided that the foot part can be fixed on the agitator and/or vessel floor through rotation around a rotational axis of the agitator. In this embodiment, the foot part is rotated around the rotational axis to fix the agitator to the vessel floor (and hence also to fix the foot part on the vessel floor). This makes it especially easy to move a contact element arranged on the foot part against the blocking element, or a blocking element arranged on the foot part against a contact element of the vessel floor. If the agitator has not been properly inserted into the vessel floor, the foot part cannot be clamped on the vessel floor, and the spring element acting on the blocking element or the inherently resiliently designed blocking element presses the foot part back into the blocking position, so that a user is unable to correctly insert the mixing vessel into the food processor. The foot part for fixing the agitator on the vessel floor is then moved through rotation around the rotational axis of the mixing vessel in a plane corresponding to the swivel plane of the pawl proposed above or the displacement plane of the locking bolt proposed above. This yields an optimal interaction within the meaning of the invention.

It can further be provided that the foot part and a bearing body of the agitator that holds an agitator shaft have corresponding fixation means, which can be secured to each other to fix the agitator in place. It is here provided that the fixation means can only be secured to each other if the vessel floor is arranged between the agitator and foot part, which is routinely the case when the agitator has been properly inserted into the mixing vessel. The agitator shaft then reaches through a floor opening in the vessel floor until the fixation means of the bearing body protrude into a plane aligned parallel to the vessel floor, in which the corresponding fixation means of the foot part are arranged. The fixation means of the foot part and bearing body of the agitator can then be secured to each other, for example via latching, crimping or the like. Fixing the agitator on the vessel floor requires that the bearing body or foot part each have at least one fixation means. However, it is advantageous if the latter each have a plurality of fixation means, for example which are arranged in the circumferential direction of the bearing body of the agitator, especially preferably equidistantly.

In this conjunction, it is proposed in particular that the bearing body of the agitator have at least one outwardly facing bearing projection relative to a rotational axis of the agitator, and that the foot part have a foot part opening for receiving the bearing body, wherein the foot part opening has at least one fixing ramp for securing the bearing projection. In this embodiment, the corresponding fixation means on the one hand have a bearing projection arranged or formed on the bearing body and a fixing ramp arranged or formed on the foot part, which can be secured to each other as a kind of crimped connection. In relation to a state in which the agitator and foot part are mounted on the vessel floor, the bearing projection and fixing ramp lie in directly adjacent planes as viewed in the direction of the rotational axis, so that the bearing projection of the bearing body slides along the fixing ramp of the foot part opening given a fixation movement of the foot part until a final position has been reached, in which the bearing projection is clamped with the fixing ramp to the maximum possible extent, and the agitator is non-rotationally clamped to the vessel floor.

It is proposed in particular that the bearing body have a plurality of bearing projections, which as viewed in a direction parallel to the rotational axis are arranged in three planes spaced apart from each other, wherein the bearing projections have at least one setting projection arranged in a first plane for engaging into a corresponding fixation means of the vessel floor, at least one bearing ramp arranged in a second plane, and at least one fixation projection arranged in a third plane, wherein the fixing ramp of the foot part can be fixed between the bearing ramp and fixation projection. The setting projection arranged in the first plane here serves to engage into a corresponding fixation means of the vessel floor. For example, the setting projection lies precisely in the plane of the vessel floor with the agitator correctly arranged on the vessel floor. For example, the fixation means of the vessel floor is here a corresponding recess in relation to the shape of the setting projection, into which the setting projection can engage, and thereby prevent the agitator from rotating relative to the vessel floor. The second plane extends from the first plane into the interior of the foot part, and incorporates the bearing ramp, which is designed to interact with a corresponding fixing ramp of the foot part opening. The bearing ramp is designed like a kind of saw tooth, the flank of which faces in a direction corresponding to a rotational direction of the foot part necessary for releasing the fixation between the foot part and agitator. When the mixing vessel, agitator and foot part are correctly arranged, the flank of the bearing ramp and the fixing ramp do not come together in the circumferential direction, so that the foot part can rotate in both the locking direction and release direction. Only in a case where the vessel floor is not located between the foot part and agitator does the flank of the bearing ramp stop the foot part from rotating. In the correctly assembled position, the fixation projection arranged in the third plane also protrudes into the interior of the foot part, and is spaced apart from the bearing ramp arranged in the second plane by a distance sufficient to accommodate the fixing ramp of the foot part opening, wherein the gradient of the fixing ramp of the foot part opening causes the agitator, foot part and vessel floor to become jammed as the foot part continues to rotate around the rotational axis.

Finally proposed in addition to the mixing vessel described above is also an electric motor-operated food processor, which has a base unit and a mixing vessel that can be connected with the base unit that is equipped with one or several of the features described in relation to the mixing vessel. The features and advantages of the electric motor-operated food processor are here analogous to the features and advantages described in relation to the mixing vessel.

BRIEF DESCRIPTION OF THE DRAWINGS

The invention will be described in more detail below based on exemplary embodiments. Shown on.

DESCRIPTION OF EMBODIMENTS

Figure 1:
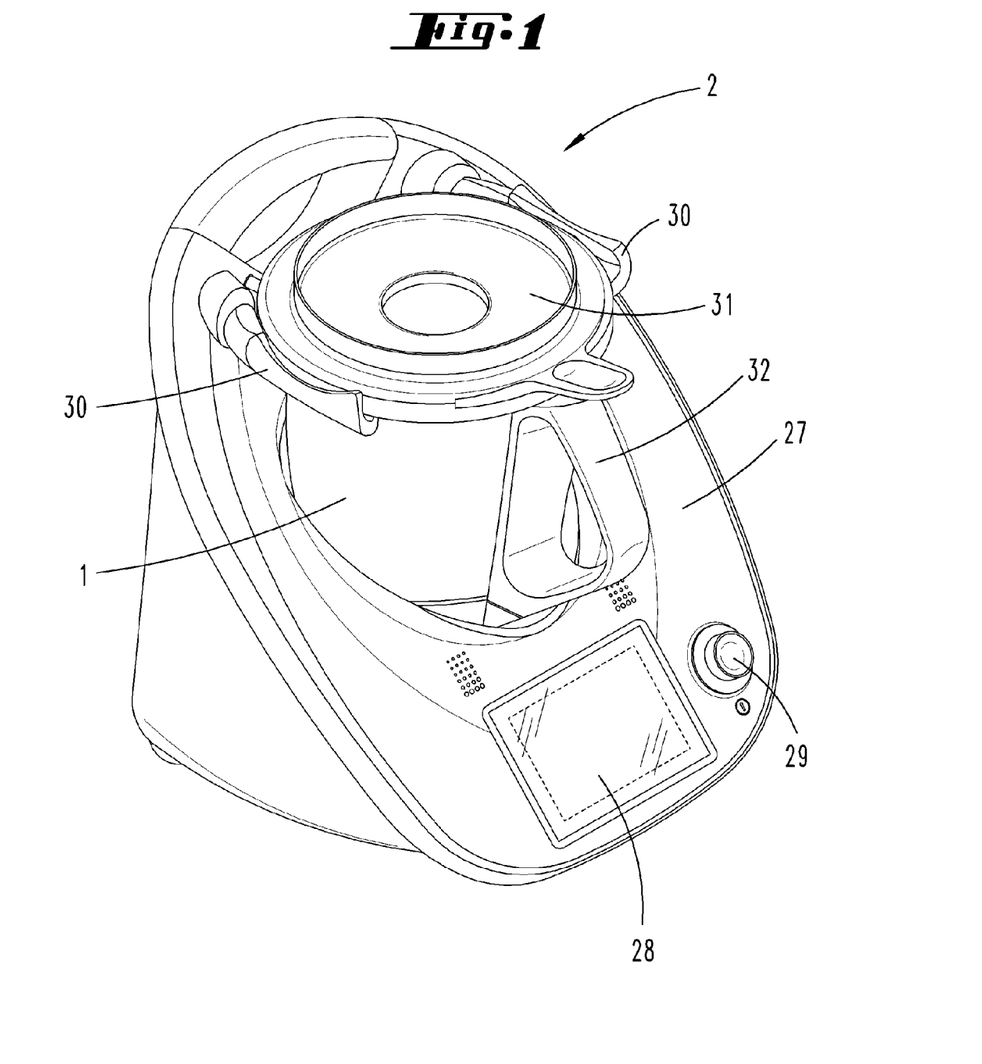
FIG. 1 is an electric motor-operated food processor with a mixing vessel inserted therein.

FIG. 1 shows a food processor 2 according to the invention with a mixing vessel 1. The food processor 2 has a base unit 27 with a mixing vessel receptacle, into which the mixing vessel is inserted. In the mixing vessel 1, the vessel floor 3 has allocated to it an agitator 4 (not depicted on FIG. 1) that can be operated via an electric drive (not depicted) arranged in the base unit 27. The mixing vessel 1 has an essentially perpendicularly aligned handle 32, has a pot-like design with circular cross section, and carries the agitator 4 centrally arranged on the vessel floor 3. An electrical resistance heater can also be allocated to the vessel floor 3.

The base unit 27 of the food processor 2 further has a display 28, on which a selection menu, preparation instructions or the like can be displayed. Situated adjacent thereto is a switch 29, which is here configured as a rotary key switch. The latter can be used to turn the food processor 2 on and off on the one hand, and make a selection on the other, for example which is shown on the display 28. The base unit 27 additionally has two locking cylinders 30, which serve to lock the mixing vessel 1 with a cover 31.

Figure 2:
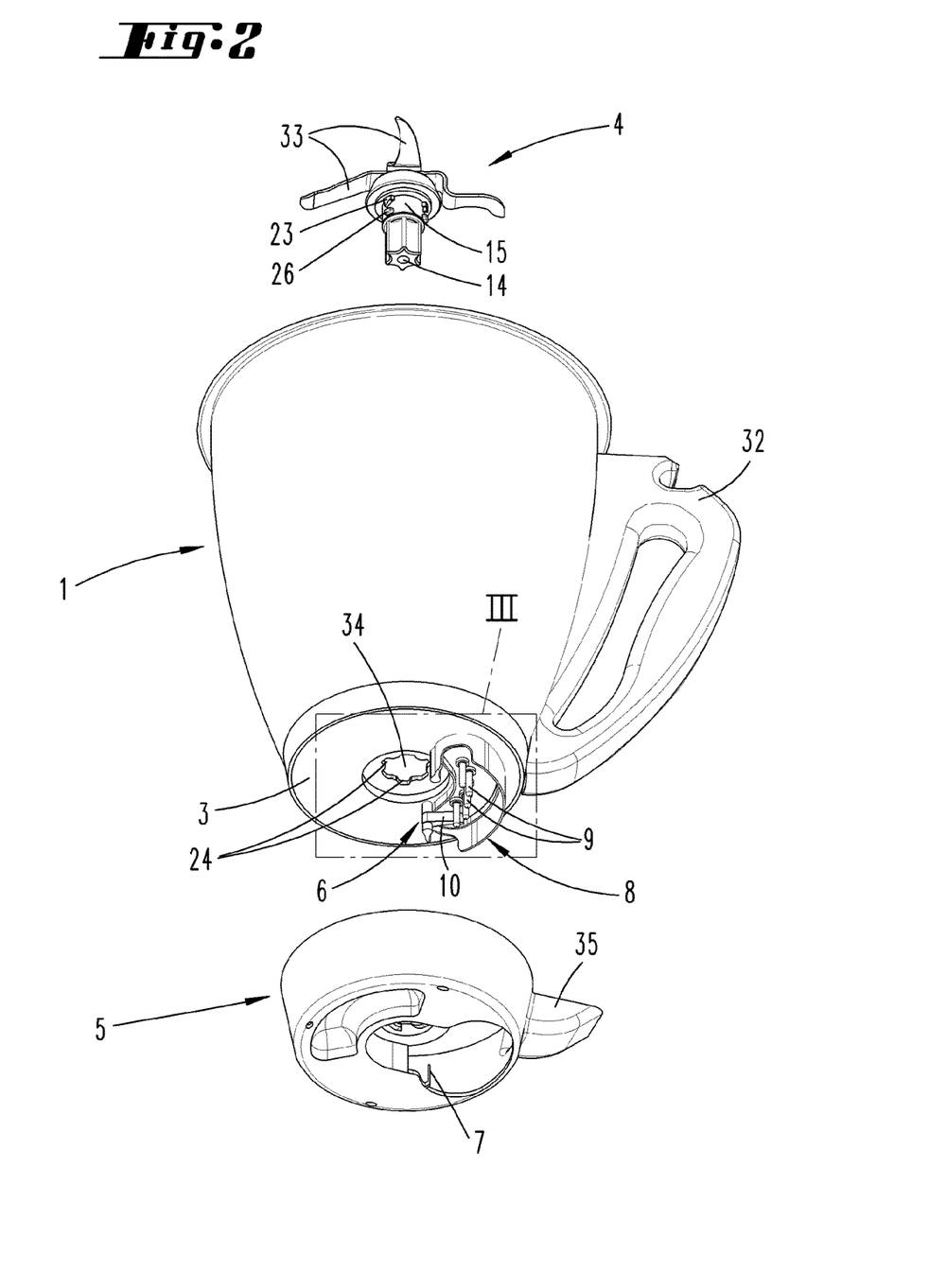
FIG. 2 is an exploded view of the mixing vessel with an agitator, a vessel floor and a foot part.

FIG. 2 shows an exploded view of the mixing vessel 1 with the agitator 4 removed, and a foot part 5 taken off of the vessel floor 3 of the mixing vessel 1. The agitator 4 is here configured as a blade bearing with a plurality of blades 33, which are non-rotationally joined with an agitator shaft 14. The agitator shaft 14 is rotatably accommodated in a bearing body 15 of the agitator 4, which can be guided through a floor opening 34 of the vessel floor 3 of the mixing vessel 1, so as to non-rotationally join the latter with the vessel floor 3. Several setting projections 23 are arranged on the bearing body 15, and can be guided by corresponding fixation means 24 of the floor opening 34 of the vessel floor 3. Each fixation means 24 is here a receiving area that corresponds in terms of its shape to a setting projection 23. Four such setting projections 23 or fixation means 24 are used in the illustration.

Several electrical contacts 9 in the form of contact pins are further arranged on the exterior side of the vessel floor 3 in a connecting area 8 used for connection with a corresponding connecting area of the base unit 27. A blocking element 6 is allocated to the connecting area 8, and here configured like a pawl 10 that can pivot around a vertical swivel axis 11. In the disassembled state of the foot part 5 depicted, the pawl 10 abuts against the adjacent electrical contact 9, and thus protrudes into the connecting area 8.

Just as the mixing vessel 1, the foot part 5 is essentially pot-shaped in design, and serves as a receptacle for the vessel floor 3 of the mixing vessel 1. The foot part 5 provides a standing surface for the mixing vessel 1, for example so that the latter can be placed on a countertop, in particular if the vessel floor 3 has been heated by the heating device. With the foot part 5 mounted to the vessel floor 3, the electrical contacts 9 extend into the interior of the foot part 5. The foot part 5 can in turn be joined with the mixing vessel receptacle of the base unit 27 of the food processing machine 2 so as to correspond in terms of shape. The electrical contacts 9 of the mixing vessel 1 here come into contact with corresponding counter-contacts of the base unit 27. The foot part 5 has a contact element 7, which with the foot part 5 correctly mounted to the vessel floor 3 acts against the blocking element 6 designed as a pawl 10.

The foot part 5 is assembled with the vessel floor 3 in such a way as to initially place the foot part 5 against the vessel floor 3 so that a foot part handle 35 faces in a radial direction relative to a rotational axis 13 of the agitator 4 that deviates from a radial direction of the handle 32 of the mixing vessel 1. The foot part 5 is then rotated around the rotational axis 13, so that the foot part handle 35 is pivoted toward the handgrip 32. The rotation of the foot part 5 simultaneously also displaces the contact element 7 arranged thereon, which comes into contact with the blocking element 6, i.e., here the pawl 10. As rotation continues, the contact element 7 presses the blocking element 6 against the restoring force of a spring element 36 away from the electrical contact 9 and out of the connecting area 8, so that all electrical contacts 9 are freely accessible, and, when arranging the mixing vessel 1 in the base unit 27, can be connected with corresponding counter-contacts. If the foot part 5 was incorrectly mounted to the mixing vessel 1, the blocking element 6 protrudes into the connecting area 8, and prevents a correspondingly shaped connection from being established between the mixing vessel 1 and base unit 27.

Figure 3:
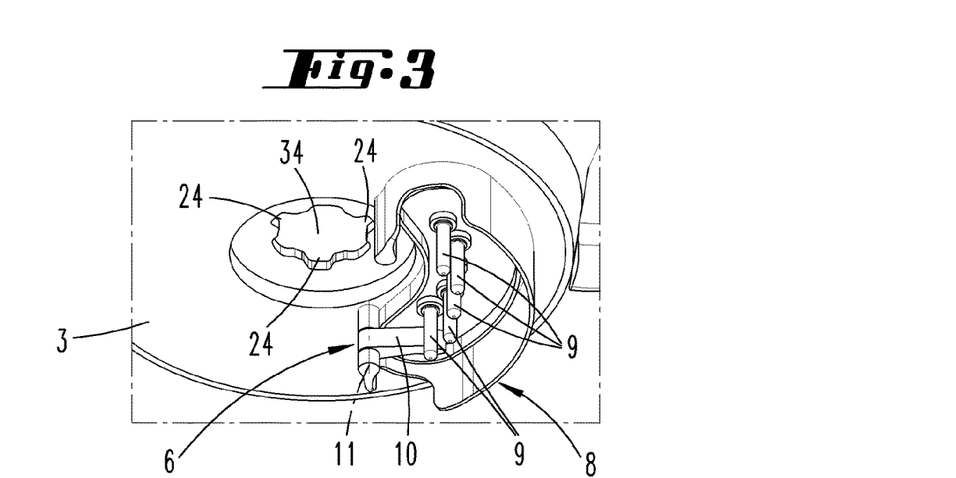
FIG. 3 is a magnified view of a partial area of the vessel floor according to FIG. 2.

FIG. 3 shows a magnified cutout of the vessel floor 3, in which are arranged the floor opening 34 with the fixation means 24, the connecting area 8 with the electrical contacts 9, the blocking element 6 and the spring element 36 allocated to the blocking element 6.

Figure 4:
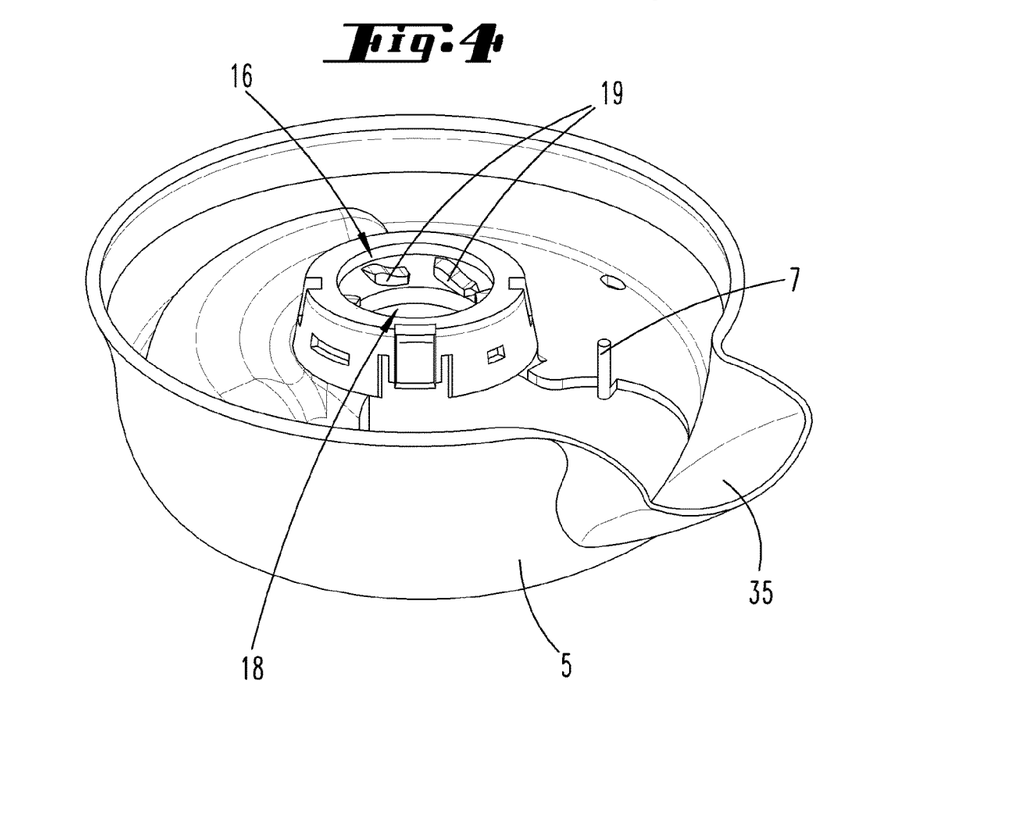
FIG. 4 is the foot part in a perspective view from inside according to a first embodiment.

FIG. 4 shows a perspective view into the foot part 5 of the mixing vessel 1. The foot part 5 has a foot part opening 18, which is formed centrally on the foot part 5, and when mounted on the vessel floor 3 (and with the mixing vessel 1 standing upright) lies under the floor opening 34 of the vessel floor 3, so that both the foot part opening 18 and the floor opening 34 are arranged symmetrically to the rotational axis 13, and lie one behind the other in the direction of the rotational axis 13. The foot part opening 18 and floor opening 34 are essentially the same size, so that the bearing body 15 of the agitator 4 can be passed through both. The foot part opening 18 has fixation means 16, which correspond to appropriate bearing projections 17 of the agitator 4, so that the agitator 4 can be clamped to the vessel floor 3 and the foot part 5. The fixation means 16 are here designed as fixing ramps 19. FIG. 4 further shows the contact element 7 arranged on the foot part 5, which protrudes into the interior of the foot part 5 in such a way that the latter engages into the connecting area 8 of the vessel floor 3 while assembling the foot part 5 to the vessel floor 3, and there potentially interacts with the blocking element 6.

Figure 5:
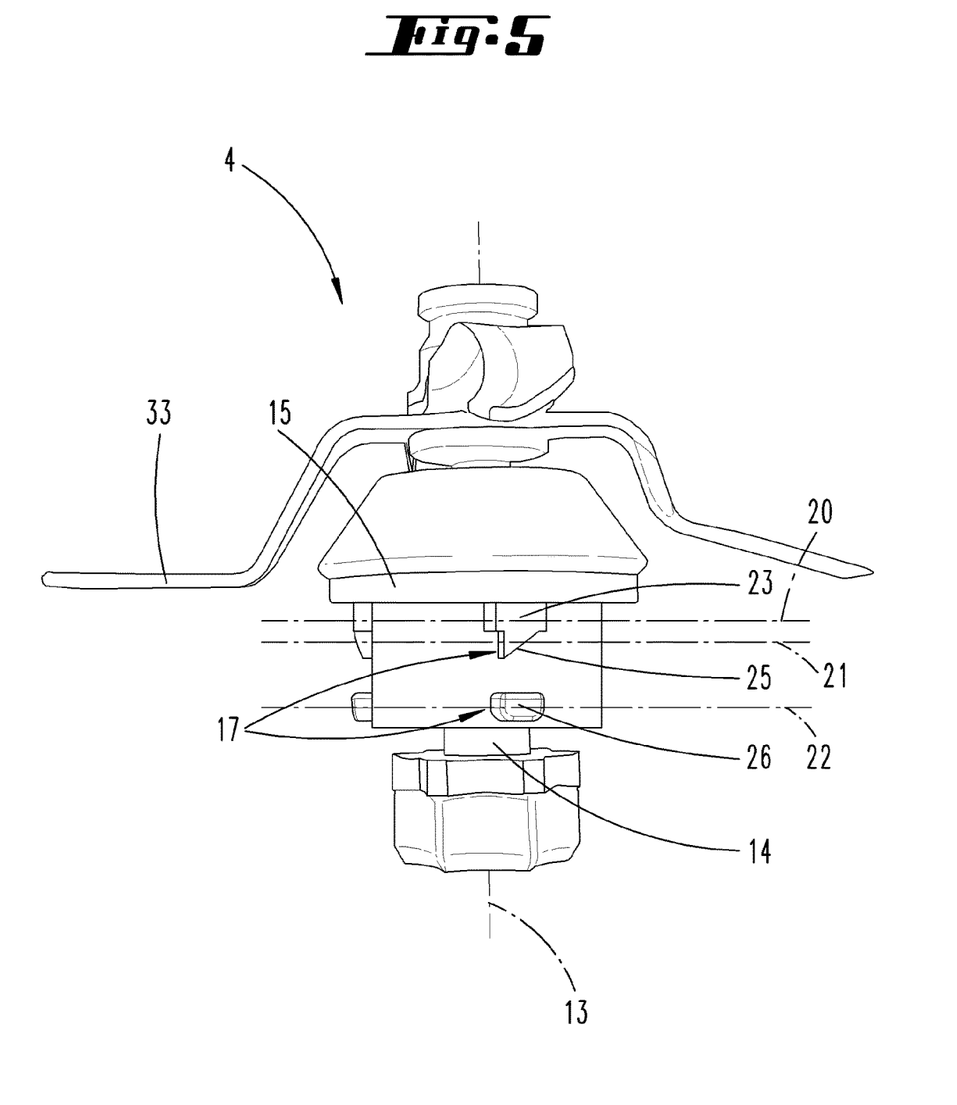
FIG. 5 is a detailed view of the agitator.

FIG. 5 provides a detailed view of the agitator 4 with the blades 33, which are non-rotationally joined with the agitator shaft 14. The agitator shaft 14 rotates around the rotational axis 13. Several setting projections 23 are arranged on the bearing body 15 that can be non-rotationally joined with the vessel floor 3, which serve to engage into the fixation means 24 of the floor opening 34 in the vessel floor 3 of the mixing vessel 1. Two respective bearing projections 17, specifically a bearing ramp 25 and a fixation projection 26, are arranged under each setting projection 23 in the same radial direction relative to the rotational axis 13. The setting projection 23 is arranged in a first plane 20 in relation to the extension direction of the rotational axis 13. The bearing ramp 25 or bearing ramps 25 (in the circumferential direction of the bearing body 15) is/are arranged in a second plane 21 spaced apart therefrom, and the fixation projections 26 in a third plane 22. The setting projection 23 and bearing ramp 25 pass directly over into each other, while the bearing ramp 25 and fixation projection 26 are spaced apart from each other in the direction of the rotational axis 13, so that, when arranging the agitator 4 and foot part 5 on the vessel floor 3, a corresponding fixing ramp 19 of the foot part 5 can later be accommodated between the latter.

Figure 6:
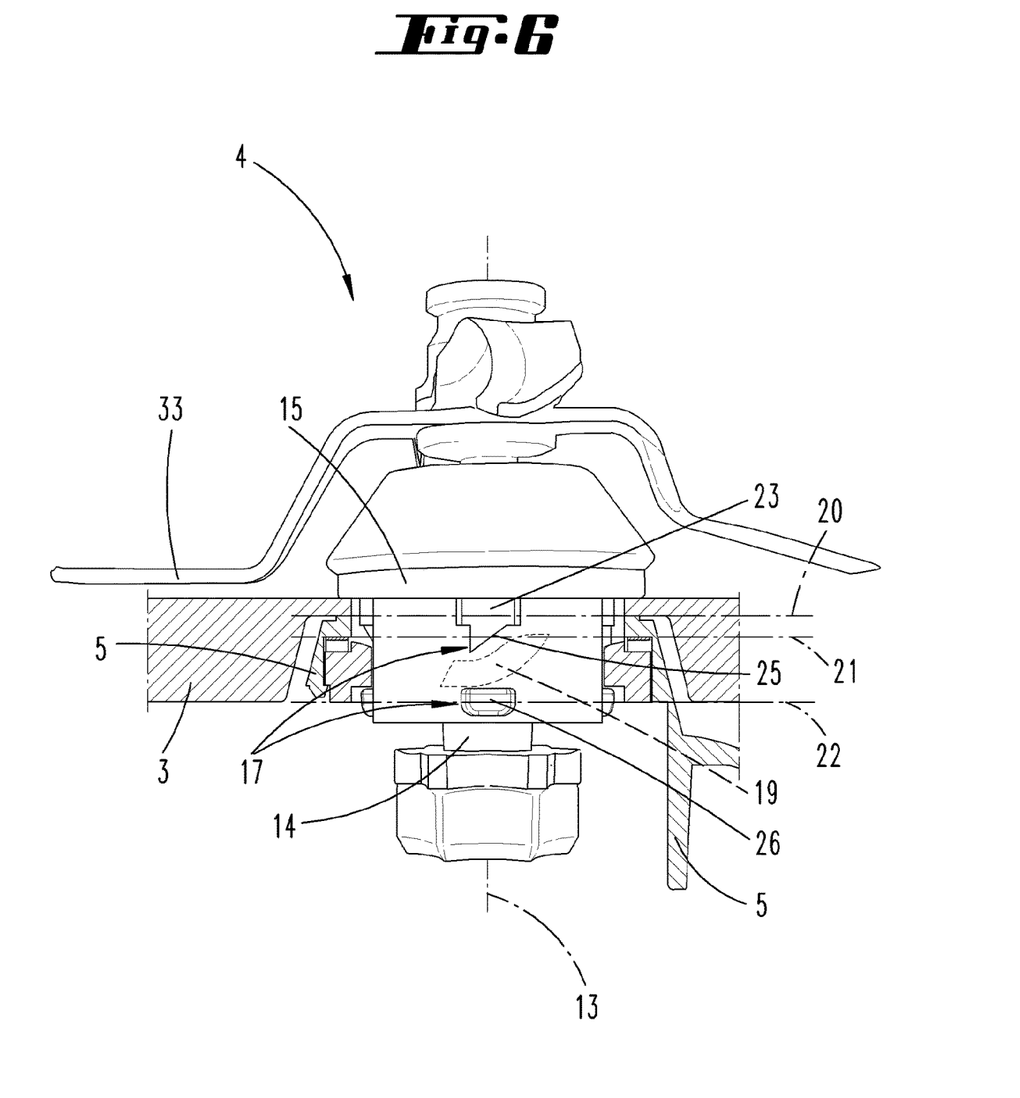
FIG. 6 is the agitator in a state mounted on the vessel floor.

FIG. 6 shows a state of the agitator 4 in which it is arranged on the vessel floor 3. The fixing ramp 19 of the foot part 5 is here guided between the bearing ramp 25 and fixation projection 26 of the bearing body 15 of the agitator 4. At the same time, the fixation means 24 of the floor opening 34 in the vessel floor 3 and the setting projections 23 of the bearing body 15 are engaged with each other, so that the bearing body 15 is secured on the foot part 5 simultaneously to securing the vessel floor 3. As a consequence, both the vessel floor 3, and the agitator 4 and foot part 5, are interconnected, here specifically by a crimped connection.

Figure 7:
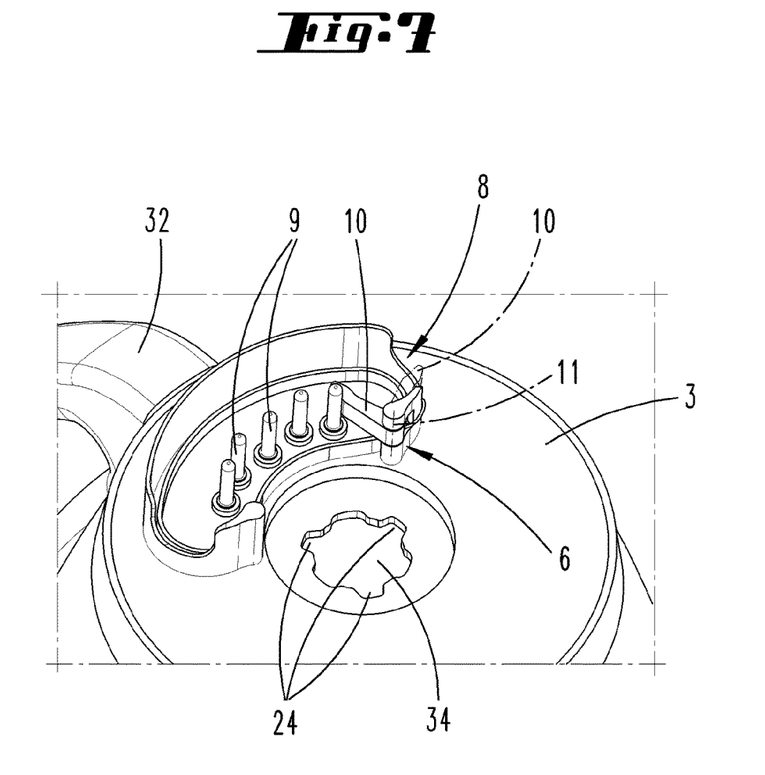
FIG. 7 is a perspective view of the vessel floor with a pivotable blocking element.

FIG. 7 shows a bottom view of the mixing vessel 1 on the plane of the vessel floor 3. In evidence are the floor opening 34 with the fixation means 24, which are designed to accommodate the setting projections 23 of the bearing head 15 of the agitator 4, as well as the connecting area 8 of the vessel floor 3, in which five electrical contacts 9 are formed. The blocking element 6 designed as a pawl 10 abuts against one of the electrical contacts 9. The blocking element 6 can be pivoted around the swivel axis 11, and is exposed to the force of the spring element 36, which here takes the form of a leg spring. The restoring force of the spring element 36 faces the direction of the electrical contact 9 against which the blocking element 6 abuts in the blocking position. By contrast, a release position is shown with a dashed line. The blocking element 6 can achieve this release position upon overcoming the restoring force of the spring element 36. The restoring force is overcome using the contact element 7 arranged on the foot part 5, which can press the blocking element 6 from the blocking position abutting the electrical contact 9 into the release position denoted by a dashed line.

Figure 8:
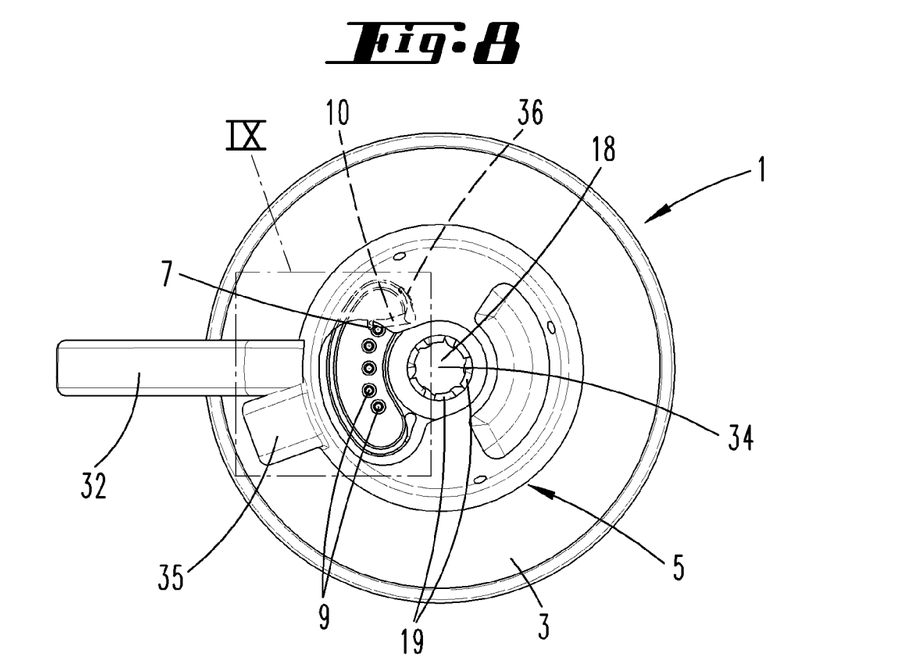
FIG. 8 is a bottom view of the mixing vessel with foot part while the blocking element is in the blocking position.
Figure 9:
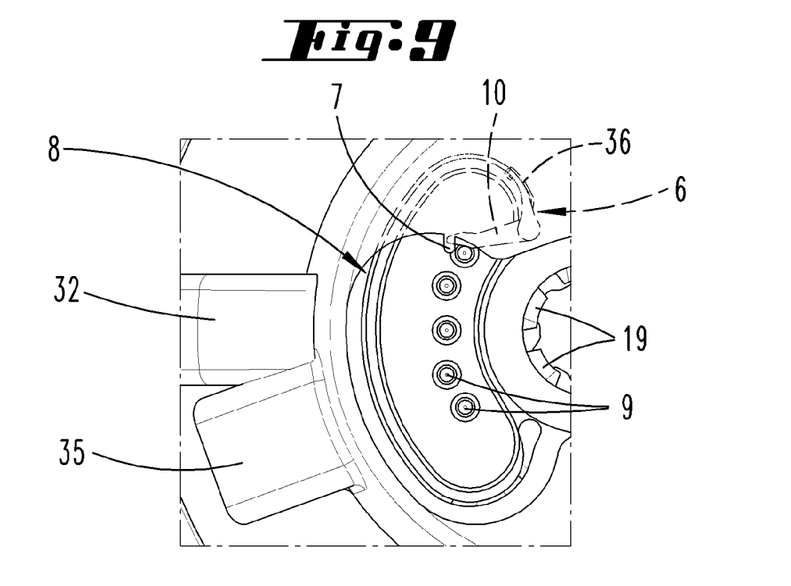
FIG. 9 is a magnified section of a connecting area of the mixing vessel.

FIG. 8 shows a bottom view of the mixing vessel 1 with the foot part 5 arranged thereon. FIG. 9 shows a magnified cutout thereof. The foot part 5 is still in a state where not yet non-rotationally arranged on the mixing vessel 1. The foot part handle 35 and the handgrip 32 of the mixing vessel 1 are here not yet aligned in the same radial direction relative to the rotational axis 13 of the agitator 4. In relation to the blocking element 6 of the mixing vessel 1, this corresponds to the blocking position in which the blocking element 6 protrudes into the connecting area 8 of the mixing vessel, a portion of the connecting area 8 is shaded by the foot part 5, and the electrical contacts 9 of the mixing vessel 1 as a result cannot be connected with corresponding counter-contacts of the base unit 27 of the food processor 2. If a user attempts to connect the mixing vessel 1 with the base unit 27 in this state, the correspondingly shaped connection between the mixing vessel 1 and base unit 27 fails on the one hand because the foot part handle 35 protrudes beyond the handgrip 32, and on the other hand because the blocking element 6 abuts against the electrical contact 9, which prevents a correspondingly shaped introduction of the electrical contacts 9 into the corresponding counter-contacts of the base unit 27.

Figure 10:
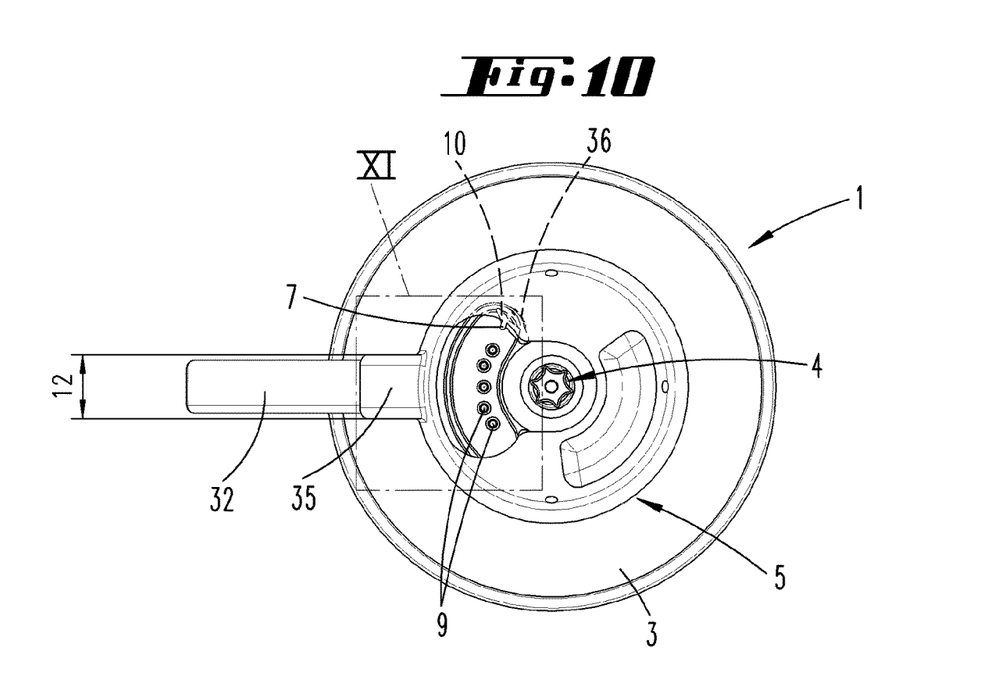
FIG. 10 is a bottom view of the mixing vessel with foot part while the blocking element is in the release position.
Figure 11:
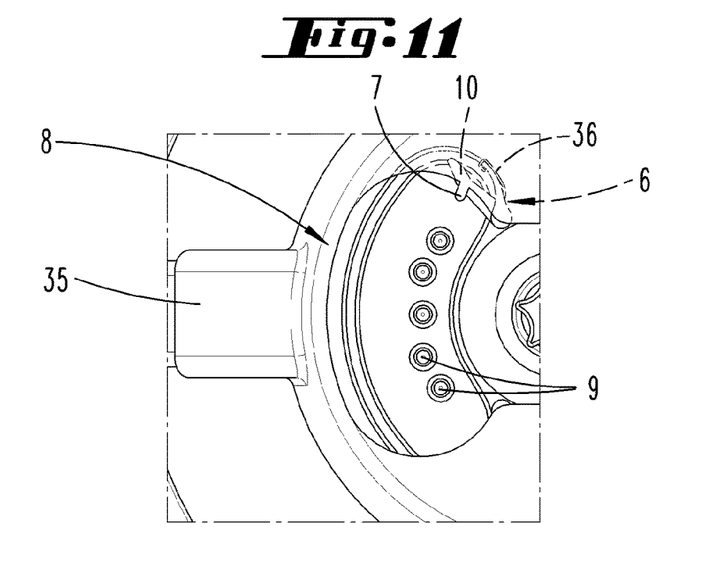
FIG. 11 is a magnified view of the connecting area.

By contrast, FIG. 10 shows the release position of the blocking element 6, in which the blocking element 6 is pressed out of the connecting area 8 by means of the contact element 7. In this release position, the handgrip 32 of the mixing vessel 1 and the foot part handle 35 of the foot part 5 lie in the same radial direction relative to the rotational angle 13 of the agitator 4. The force applied during the rotation of the foot part 5 makes it possible to overcome the restoring force of the spring element 36, so that the contact element 7 can completely remove the blocking element 6 from the connecting area 8. The electrical contacts 9 are thus exposed, and can be connected with the counter-contacts of the base unit 27. FIG. 11 shows a magnified cutout of FIG. 10.

Figure 12:
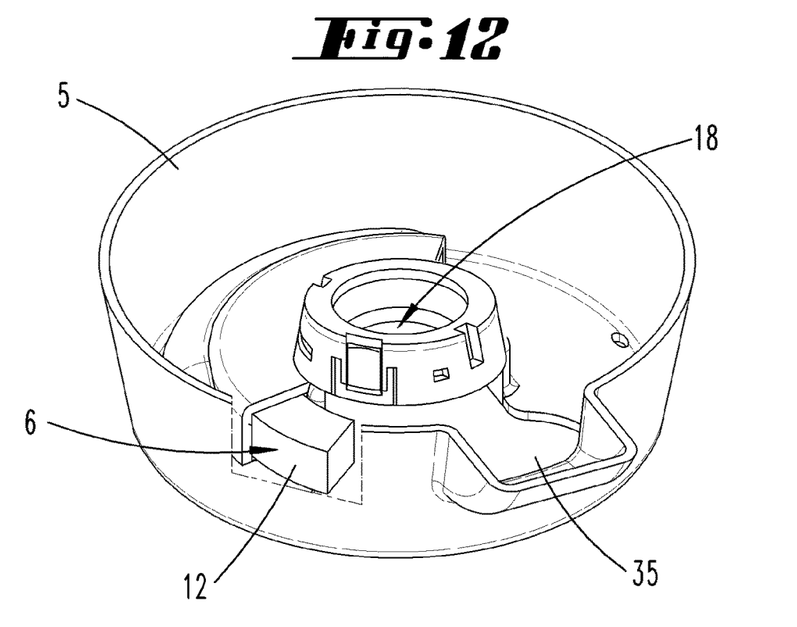
FIG. 12 is a perspective view into a foot part according to a second embodiment with a blocking element in a blocking position.

FIG. 12 shows a perspective view into the foot part 5 according to a second embodiment. The foot part 5 here has a blocking element 6, which is designed as a locking bolt 12. The locking bolt 12 is semicircular in design, and in the depicted mounted state of the foot part 5 and vessel floor 3 can be shifted in a plane parallel to the vessel floor 3, specifically around the rotational axis 13 of the agitator 4. In relation to an end region, the locking bolt 12 is joined with a spring element 36, which is here exemplarily designed as a helical spring. In the situation as illustrated on FIG. 12, the spring element 36 is expanded in the direction of the restoring force, so that an end region of the locking bolt 12 lying opposite the spring element 36 is maximally shifted into a blocking position.

Figure 13:
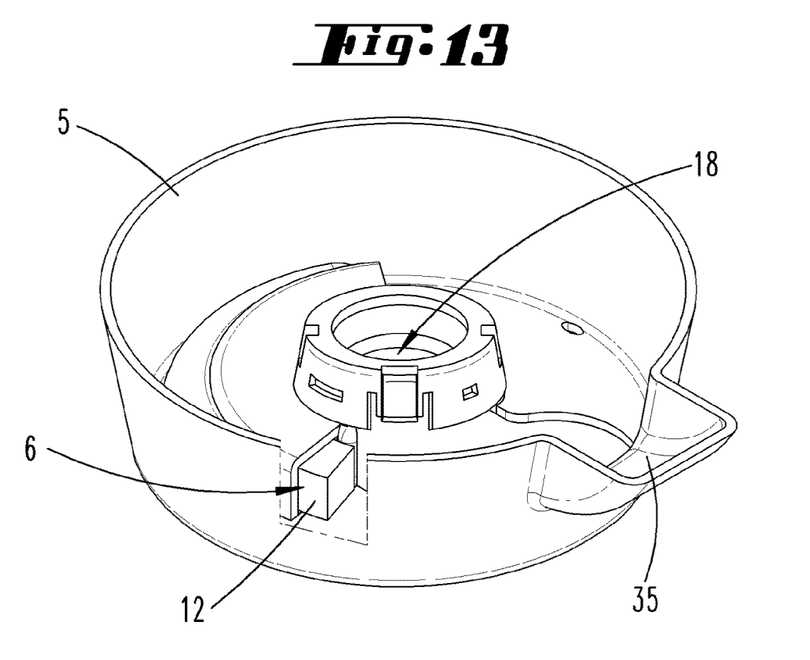
FIG. 13 is the foot part according to FIG. 12 with the blocking element in a release position.

FIG. 13 shows a perspective view into the foot part 5 with the locking bolt 12 retracted. The locking bolt 12 is here retracted against the restoring force of the spring element 36. This position can only be reached if the agitator 4 has been correctly braced on a vessel floor 3 and a foot part 5, and the locking bolt 12 has been pressed back from a contact element 7 of the vessel floor 3 into the release position.

Figure 14:
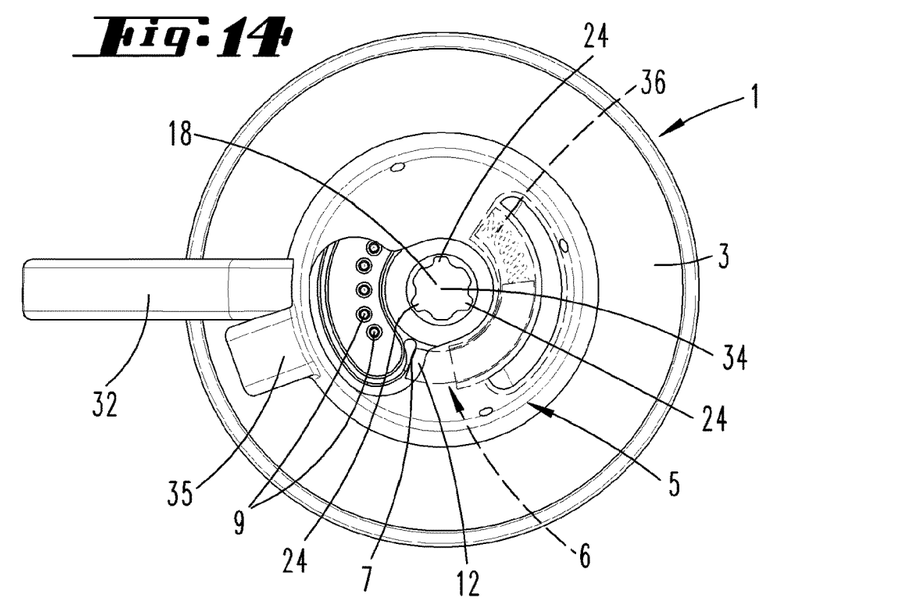
FIG. 14 is a bottom view of a mixing vessel with the foot part according to FIG. 12 while the blocking element is in a blocking position.
Figure 15:
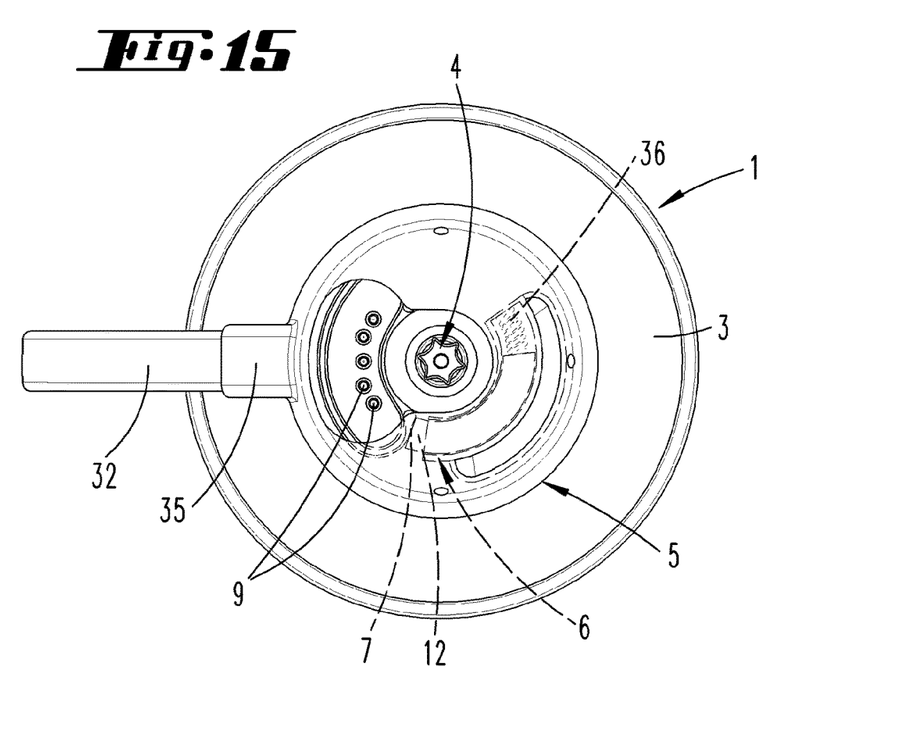
FIG. 15 is the mixing vessel with the foot part according to FIG. 13 while the blocking element is in the release position.

FIGS. 14 and 15 each show a bottom side of a mixing vessel 1 with a foot part 5 arranged thereon. No agitator 4 is arranged in the mixing vessel 1 on FIG. 14, so that the foot part 5 is not fixed relative to the bottom side of the mixing vessel 1. On FIG. 15, an agitator 4 is mounted in the mixing vessel 1, and fixed on both the foot part 5 and vessel floor 3 of the mixing vessel 1.

According to FIG. 14, the spring element 36 is expanded, so that the end region of the locking bolt 12 lying opposite the spring element 36 is shifted into the blocking position, and shifts the foot part 5 in relation to the vessel floor 3 of the mixing vessel 1 in such a way that the foot part 5 covers a portion of the connecting area 8 of the vessel floor 3. The electrical contacts 9 are arranged in the connecting area 8, so that they cannot be connected with corresponding counter-contacts of the base unit 27. In order to now be able to connect the electrical contacts 9 with the counter-contacts of the base unit 27, it is required that the foot part 5 be shifted in such a way as to reach the position depicted on FIG. 15. For this purpose, the user of a food processor 2 guides the agitator 4 through the floor opening 34 of the vessel floor 3 on the one hand, and through the foot part opening 18 of the foot part 5 on the other. The foot part 5 can then be braced relative to the vessel floor 3 and foot part 5, so that the restoring force of the spring element 36 can be overcome, and the connecting area 8 is released. The spring element 36 here presses against the corresponding contact element 7 of the vessel floor 3, and can thus be compressed with the release of the connecting area 8. Otherwise, the statements made relative to the first embodiment on FIGS. 8 to 11 apply analogously.

| Reference List | |
|---|---|
| 1 | Mixing vessel |
| 2 | Food processor |
| 3 | Vessel floor |
| 4 | Agitator |
| 5 | Foot part |
| 6 | Blocking element |
| 7 | Contact element |
| 8 | Connecting area |
| 9 | Electrical contact |
| 10 | Pawl |
| 11 | Swivel axis |
| 12 | Locking bolt |
| 13 | Rotational axis |
| 14 | Agitator shaft |
| 15 | Bearing body |
| 16 | Fixation means |
| 17 | Bearing projection |
| 18 | Foot part opening |
| 19 | Fixing ramp |
| 20 | Plane |
| 21 | Plane |
| 22 | Plane |
| 23 | Setting projection |
| 24 | Fixation means |
| 25 | Bearing ramp |
| 26 | Fixation projection |
| 27 | Base unit |
| 28 | Display |
| 29 | Switch |
| 30 | Locking cylinder |
| 31 | Cover |
| 32 | Handgrip |
| 33 | Blade |
| 34 | Floor opening |
| 35 | Foot part handle |
| 36 | Spring element |

The invention claimed is:

1. A mixing vessel (1) for an electric motor-operated food processor (2), with a vessel floor (3), an agitator (4) extending through the vessel floor (3) into the mixing vessel (1), and a foot part (5) that can be externally connected with the vessel floor (3), which is designed for fixing the agitator (4) to the vessel floor (3), wherein the vessel floor (3) or foot part (5) has a blocking element (6) that can be exposed to the spring force of a spring element (36), and can be shifted against the spring force by means of a corresponding contact element (7) of the foot part (5) or vessel floor (3) that functions to shift the blocking element (6) from a blocking position that prevents a fixation of the agitator (4) into a release position that enables a fixation, such that in the absence of an agitator (4) on the vessel floor (3) the foot part (5) is prevented from becoming fixed on the vessel floor (3) and the foot part (5) remains displaceable relative to the vessel floor (3) and is pressed back into the blocking position by the blocking element (6).

2. The mixing vessel (1) according to claim 1, wherein the blocking element (6) is arranged on the vessel floor (3) or foot part (5) in such a way relative to a relaxed state of the spring element (36) as to protrude into a connecting area (8) formed to join the mixing vessel (1) with an electric motor-operated food processor (2), thereby preventing a connection.

3. The mixing vessel (1) according to claim 2, wherein the connecting area (8) has electrical contacts (9) for connection with corresponding counter-contacts of an electric motor-operated food processor (2).

4. The mixing vessel (1) according to claim 1, wherein the blocking element (6) is a pawl (10) pivoted to the vessel floor, which can be pivoted around a swivel axis (11) arranged perpendicular to the vessel floor (3).

5. The mixing vessel (1) according to claim 1, wherein the blocking element (6) is a locking bolt (12) slideably arranged on the foot part (5), which can be shifted into a plane parallel to the vessel floor (3) relative to a connected state of the vessel floor (3) and foot part (5).

6. The mixing vessel (1) according to claim 1, wherein the foot part (5) can be fixed on the agitator (4) and/or vessel floor (3) through rotation around a rotational axis (13) of the agitator (4).

7. The mixing vessel (1) according to claim 1, wherein the foot part (5) and a bearing body (15) of the agitator (4) that holds an agitator shaft (14) have corresponding fasteners (16), which can be secured to each other to fix the agitator (4) in place.

8. The mixing vessel (1) according to claim 7, wherein the bearing body (15) of the agitator (4) has at least one outwardly facing bearing projection (17) relative to a rotational axis (13) of the agitator (4), and wherein the foot part (5) has a foot part opening (18) for receiving the bearing body (15), wherein the foot part opening (18) has at least one fixing ramp (19) for securing the bearing projection (17).

9. The mixing vessel (1) according to claim 8, wherein the bearing body (15) has a plurality of bearing projections (17), which as viewed in a direction parallel to the rotational axis (13) are arranged in three planes (20, 21, 22) spaced apart from each other, wherein the bearing projections (17) have at least one setting projection (23) arranged in a first plane (20) for engaging into a corresponding fixation means (24) of the vessel floor (3), at least one bearing ramp (25) arranged in a second plane (21), and at least one fixation projection (26) arranged in a third plane (22), wherein the fixing ramp (19) of the foot part (5) can be fixed between the bearing ramp (25) and fixation projection (26).

10. An electric motor-operated food processor (2) with a base unit (27) and a mixing vessel (1) that can be connected with the base unit (27), wherein the mixing vessel (1) is designed according to claim 1.

\* \* \* \* \*